(12) United States Patent
Frederiksen et al.

(10) Patent No.: US 8,068,513 B2
(45) Date of Patent: Nov. 29, 2011

(54) DETERMINING LOAD MEASURE FOR NETWORK ELEMENT

(75) Inventors: Frank Frederiksen, Klarup (DK);
Klaus Pedersen, Aalborg (DK);
Woonhee Hwang, Espoo (FI); Troels Kolding, Klarup (DK); Preben Mogensen, Gistrup (DK)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 315 days.

(21) Appl. No.: 12/151,583

(22) Filed: May 6, 2008

(65) Prior Publication Data
US 2009/0080342 A1   Mar. 26, 2009

Related U.S. Application Data

(60) Provisional application No. 60/927,967, filed on May 7, 2007.

(51) Int. Cl.
*H04J 3/16* (2006.01)
(52) U.S. Cl. ........... 370/468; 370/230; 370/236.1; 370/335; 370/320; 370/465
(58) Field of Classification Search .......... 370/253, 370/332, 335, 320, 465, 449, 252, 230, 468, 370/209, 331
See application file for complete search history.

(56) References Cited

U.S. PATENT DOCUMENTS

| | | | | |
|---|---|---|---|---|
| 5,949,862 | A * | 9/1999 | Fukuzawa et al. | 379/112.01 |
| 6,466,559 | B1 * | 10/2002 | Johansson et al. | 370/335 |
| 6,738,624 | B1 * | 5/2004 | Aksentijevic et al. | 455/452.1 |
| 7,343,176 | B2 * | 3/2008 | Ahn et al. | 455/560 |
| 7,580,716 | B2 * | 8/2009 | Ransom et al. | 455/452.2 |
| 7,738,907 | B2 * | 6/2010 | Xiao et al. | 455/522 |
| 7,860,510 | B2 * | 12/2010 | Kroth et al. | 455/453 |
| 2002/0021673 | A1 * | 2/2002 | Agin et al. | 370/335 |
| 2002/0077111 | A1 | 6/2002 | Spaling et al. | 455/453 |
| 2004/0127191 | A1 * | 7/2004 | Matsunaga | 455/403 |

(Continued)

FOREIGN PATENT DOCUMENTS
WO  WO 2004/043104  * 5/2004

OTHER PUBLICATIONS

3GPP TS 23.401 V8.1.0(Mar. 2008) 3$^{rd}$ Generation Partnership; Technical Specification Group Services and System Aspects; General Packet Radio Service (GPRS) enhancements for Evolved Universal Terrestrial Radio Access Network (E-UTRAN) access (Release 8).

(Continued)

*Primary Examiner* — Ricky Ngo
*Assistant Examiner* — Dewanda Samuel
(74) *Attorney, Agent, or Firm* — Ware, Fressola, Van Der Sluys & Adolphson LLP

(57) ABSTRACT

The specification and drawings present a new method, system, apparatus and software product for determining (e.g., calculating) a load measure by a network element (e.g., Node B or any other network element) for optimizing information traffic in communication networks (e.g., wireless communication systems). This load measure may represent the amount of available/excess traffic that a given network element may carry and is a relative measure, which would take into account the total amount of resources available in the system and the amount of resources that are free for carrying only "important" or "essential" traffic, using a weighed method described herein.

22 Claims, 2 Drawing Sheets

U.S. PATENT DOCUMENTS

| | | | |
|---|---|---|---|
| 2004/0166835 A1* | 8/2004 | Johansson et al. | 455/414.1 |
| 2004/0170179 A1* | 9/2004 | Johansson et al. | 370/395.2 |
| 2004/0203938 A1 | 10/2004 | Kulkarni | 455/464 |
| 2005/0135324 A1* | 6/2005 | Kim et al. | 370/343 |
| 2007/0155390 A1* | 7/2007 | Kodikara Patabandi et al. | 455/450 |
| 2007/0224995 A1* | 9/2007 | Frederiksen et al. | 455/437 |
| 2007/0225003 A1* | 9/2007 | Cheng et al. | 455/450 |
| 2007/0270155 A1* | 11/2007 | Nelson et al. | 455/452.2 |
| 2007/0275723 A1* | 11/2007 | Jeong et al. | 455/436 |
| 2008/0008127 A1* | 1/2008 | Choi et al. | 370/331 |
| 2008/0068981 A1* | 3/2008 | Marinier | 370/208 |
| 2008/0318578 A1* | 12/2008 | Worrall | 455/437 |

OTHER PUBLICATIONS

3GPP TS 25.423 V7.4.0 (Mar. 2007) $3^{rd}$ Generation Partnership Project; Technical Specification Group Radio Access Network; UTRAN Iur interface RNSAP signalling (Release 7).

European Patent Office; Guido Reeck; "International Search Report and Written Opinion of the International Searching Authority"; whole document; Oct. 8, 2008.

* cited by examiner

DETERMINING LOAD MEASURE FOR NETWORK ELEMENT

PRIORITY AND CROSS-REFERENCE TO RELATED APPLICATION

This application claims priority from U.S. Patent Application Ser. No. 60/927,967, filed on May 7, 2007.

TECHNICAL FIELD

This invention generally relates to communications, e.g., wireless communications, and more specifically to determining a load measure for a network element (e.g., for Node B in downlink or uplink).

BACKGROUND ART

In a new concept for a long term evolution (LTE) of 3GPP ($3^{rd}$ Generation Partnership Project), the assumption is to use extensive frequency domain packet scheduling (FDPS) to achieve a high spectral efficiency. As the LTE of 3GPP is targeted at being a cellular system providing handovers between the different evolved-Node Bs (eNBs), each of these eNBs needs knowledge of the traffic situation at the neighbouring eNBs for the network optimization. As there is no central entity in the network which will monitor the load situation for each eNB, exchanging the load information between the different neighbouring eNBs is needed.

In relation to the measurement of the load in a given cell, it is desirable to have a measurement, which will provide information to the other eNBs, which is useful for controlling the resulting performance of the network. The functions/entities, which may use this type of measurement may include (but are not limited to):

Load based handover, such that a highly loaded cell can potentially hand off traffic/UEs to a less loaded neighbouring eNB;

For deciding at which cell/carrier a UE (user equipment) should camp;

Network performance monitoring and optimization.

In order to have effective utilization of these measurements, it is useful to know the current state of the cell load, which will describe the amount of information traffic that can be used/unused. Traditionally these types of load measurements are performed using, for example, a total received power by a network element (e.g., a Node B) or in case of frequency division multiplexing (FDM) a number of occupied frequency designated channels, etc.

DISCLOSURE OF THE INVENTION

According to a first aspect of the invention, a method, comprises: providing an information traffic by a network element using all or selected blocks of a plurality of physical resource blocks available in said network element; and determining a load measure of said information traffic by a weighted method using pre-selected information of the information traffic provided by the all or selected blocks participating in the information traffic.

According further to the first aspect of the invention, the weighted method may comprise: weighing a number of the all or selected blocks with corresponding ratio of a number of digital bits used only for pre-selected information of the information traffic and a total number of digital bits both used for all user equipments participating in the information traffic.

According still further to the first aspect of the invention, the weighted method may comprise: summing a number of one or more blocks of the all or selected blocks used by each user equipment of the all user equipments participating in the information traffic weighed with corresponding ratios of a number of digital bits used only for the pre-selected information and a total user number of digital bits both used for the each user equipment.

According yet further to the first aspect of the invention, the network element may be a Node B configured for wireless communications.

Further according to the first aspect of the invention, the load measure may be determined in a predetermined time interval. Further, the predetermined time interval may be one millisecond.

Still further according to the first aspect of the invention, the information traffic may be in a downlink.

According yet further to the first aspect of the invention, the information traffic may be in an uplink.

Still yet further according to the first aspect of the invention, the method may comprise: providing the load measure to one or more neighbouring network elements.

According still further to the first aspect of the invention, the pre-selected information may be for an essential information traffic and may comprise at least one or all of: guaranteed bit rate bearers, radio resource control messages and medium access control MAC-c protocol data units.

According further still to the first aspect of the invention, each of the physical resource blocks may comprise twelve continuous sub-carriers of orthogonal frequency division multiplexing access.

According yet further still to the first aspect of the invention, the load measure may be in a range between zero and the plurality of physical resource blocks available in the network element.

According to a second aspect of the invention, a computer program product comprises: a computer readable storage structure embodying computer program code thereon for execution by a computer processor with the computer program code, wherein the computer program code comprises instructions for performing the first aspect of the invention.

According to a third aspect of the invention, a network element, comprises: transmitters and receivers, configured to provide information traffic using all or selected blocks of a plurality of physical resource blocks available in the network element; and a load determining module, configured to determine a load measure of the information traffic in a predetermined time interval by a weighted method using pre-selected information of the information traffic provided by the all or selected blocks participating in said information traffic.

According further to the third aspect of the invention, the weighted method may comprise: weighing a number of the all or selected blocks with corresponding ratio of a number of digital bits used only for pre-selected information of the information traffic and a total number of digital bits both used for all user equipments participating in the information traffic.

According still further to the third aspect of the invention, the weighted method may comprise: summing a number of one or more blocks of the all or selected blocks used by each user equipment of the all user equipments participating in the information traffic weighed with corresponding ratios of a number of digital bits used only for the pre-selected information and a total user number of digital bits both used for the each user equipment.

Further according to the third aspect of the invention, the load measure may be determined in a predetermined time interval. Further, the predetermined time interval may be one millisecond.

Still further according to the third aspect of the invention, the information traffic may be in a downlink.

According yet further to the third aspect of the invention, the information traffic may be in an uplink.

According still further to the first aspect of the invention, the network element may be a Node B configured for wireless communications.

According still yet further to the third aspect of the invention, the network element may further comprise: a load transmitting module configured to transmit the load measure to one or more neighbouring network elements.

According yet further still to the third aspect of the invention, the pre-selected information may be for an essential information traffic and may comprise at least one or all of: guaranteed bit rate bearers, radio resource control messages and medium access control MAC-c protocol data units.

According further still to the third aspect of the invention, each of the physical resource blocks may comprise twelve continuous sub-carriers of orthogonal frequency division multiplexing access.

Yet still further according to the third aspect of the invention, the load measure may be in a range between zero and the plurality of physical resource blocks available in the network element.

Still yet further according to the third aspect of the invention, an integrated circuit may comprise the load determining module and the transmitter and receivers.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
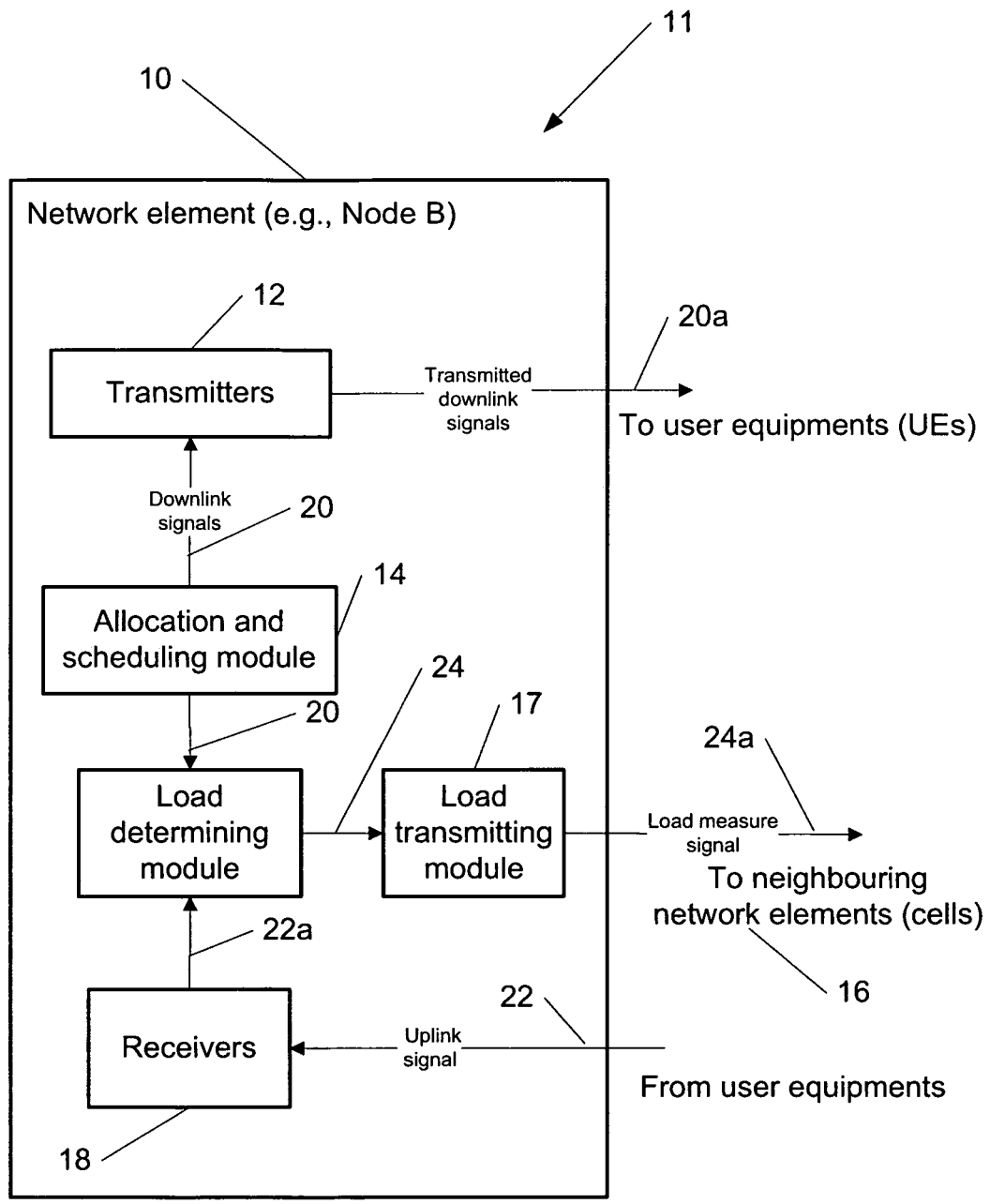
FIG. 1 is a block diagram of a network element (e.g., a Node B) for determining (e.g., calculating) a load measure, according to an embodiment of the present invention.

A new method, system, apparatus and software product are presented for determining (e.g., calculating) a load measure by a network element (e.g., evolved-Node B, eNB, or a Node B in general, a Gateway or any other network elements) for optimizing information traffic in communication networks (e.g., wireless communication systems). According to embodiments of the present invention, this load measure may represent the amount of available/excess traffic that a given network element may carry and is a relative measure, which would take into account the total amount of resources available in the system (e.g., depending on the system bandwidth) and the amount of resources that are free for carrying only "important" or "essential" traffic, using a weighted method described herein.

It is noted that in the frame of the present invention the load measure may be defined for a cell with a certain system bandwidth or information capacity which may map into a maximum number of simultaneously supported physical resource blocks (PRB) for transmission (for downlink or uplink). As an example among others, the PRB may be defined as a set of 12 continuous sub-carriers (using an orthogonal frequency division multiplexing access, OFDMA, as the access technique) for a period of 1 ms. The PRB then may be interpreted as the smallest allocation granularity with which a UE (user equipment) can be allocated. Furthermore, within each cell, the traffic may be scheduled independently in uplink and downlink, therefore the load measure may be computed separately for the uplink and downlink. For example, for the load measure calculated at the eNB, it may be calculated at the transmitter for the downlink, while it may be calculated at the receiver for the uplink.

The obvious immediate load measure would be to define a measurement, which just take into account the average number of non-used or used PRBs over a given amount of time. The disadvantage of this is that it is not possible to distinguish "important" or "essential" information traffic from "best-effort" or "non-essential" information traffic which are equivalent to a real time (RT) and a non-real time (NRT) traffics, respectively, wherein RT and NRT terms are being traditionally used (e.g., see 3GPP TS 25.423). It is noted that QoS (quality of service) parameters: GBR (guaranteed bit rate)-bearer (e.g., defined in 3GPP TS 25.401, V8.1.0, section 4.7) is for RT and non-GBR bearer (e.g., defined in 3GPP TS 25.401 V8.1.0, section 4.7) is for NRT.

Thus, according to an embodiment of the present invention, the load measure may be generated by taking into account the fact that the "best-effort" (or "non-essential") information traffic is the traffic which is carried in the network without any guarantees for the UE requesting the traffic. For the purpose of the present invention, the "important" or "essential" traffic, is considered to be a traffic, which is either guaranteed for the UE or needed for the network operation. This "essential" information traffic may be pre-selected for determining the load measure according to embodiments of the present invention as described herein. For instance, the traffic needed for the network ("essential" traffic) may include (but is not limited to): SAE (system architectural evolution) GBR (guaranteed bit rate), RRC (radio resource control) messages, and medium access control (MAC-c) protocol data units (PDUs). It is noted that the SAE bearer is called EPS (evolved packet system) bearer in the latest 3GPP documents (e.g., see 3GPP TS 25.401 V8.1.0, section 4.7). The latter two are control messages, which may be needed, for example, to inform the UEs on the configuration and assignments in the network and are crucial for the network operation.

Thus, according to one embodiment of the present invention, the load measure of the "essential" (equivalent to RT) information traffic may be determined (calculated) in a predetermined time interval (e.g., per transmission timing interval TTI) as a weighted sum of the used PRBs for the scheduled users using pre-selected essential information of the traffic as follows:

$$PRB_{load,TTI,e} = \sum_n PRB_{used}(n) \cdot \frac{TBS_{SAE\_GBR}(n) + TBS_{RRC}(n) + TBS_{Mac-C}(n)}{TBS_{total}(n)}, \quad (1)$$

wherein index n is referring to the n-th scheduled user equipment (or user) in the predetermined time interval (e.g., TTI). Hence, the number of used PRBs per user, $PRB_{used}(n)$, are weighted with the ratio of number of bits used for GBR bearers+RRC messages+MAC C-PDUs, ($TBS_{SAE\_GBR}(n)$+ $TBS_{RRC}(n)$+$TBS_{Mac-C}(n)$), for individual users (in the numerator) versus the total number of transmitted bits, (TBS$_{total}$(n)), for the corresponding individual users (in the denominator). By applying a division of the total carried payload, we here have a measure for the effective PRBs that are used for "essential" traffic, and therefore it is possible then to calculate the available traffic by subtracting this number from the total number of available PRBs in a cell which is typically supported by one Node B. The Equation 1 may be applied for downlink traffic, uplink traffic or a combination of uplink and downlink traffic.

Alternatively, according to another embodiment of the present invention, Equation 1 can be modified to apply to all users simultaneously without summation, as follows:

$$PRB_{load,TTI,e}^{all} = \tag{2}$$
$$PRB_{used}(n)^{all} \cdot \frac{TBS_{SAE\_GBR}(n)^{all} + TBS_{RRC}(n)^{all} + TBS_{Mac-C}(n)^{all}}{TBS_{total}(n)^{all}}.$$

The load measured in the Equations 1 and 2 may be in the range between 0 and N (e.g., rounded to an integer), wherein N is the maximum number of PRBs in the cell (depends on the system bandwidth). Hence, if the cell is fully loaded with transmission on all PRBs with SAE GBR traffic, then the load will equal N. The determined load measure may be reported to one or more neighbouring network elements (e.g., Node Bs) for effective control of the information traffic in the network. The load measure in the Equations 1 and 2 may be averaged over several time intervals (e.g., several TTIs) before being reported to the one or more neighbouring network elements (cells). The predetermined time interval (TTI) may be, e.g., one millisecond.

It is further noted that from an implementation perspective, it does not matter, whether to report the used load in the cell (determined from Equations 1 or 2) or the complementary unused load, i.e. N minus the average used load determined from Equations 1 or 2.

Given the same approach as described above, the equivalent per a TTI-load measure of "non-essential" (equivalent to NRT) traffic may be expressed as follows:

$$PRB_{load,TTI,ne} = \sum_n PRB_{used}(n) \cdot \tag{3}$$
$$\frac{TBS_{total}(n) - (TBS_{SAE\_GBR}(n) + TBS_{RRC}(n) + TBS_{Mac-C}(n))}{TBS_{total}(n)}, \text{ and}$$

$$PRB_{load,TTI,ne}^{all} = \tag{4}$$
$$PRB_{used}(n)^{all} \left(1 - \frac{TBS_{SAE\_GBR}(n)^{all} + TBS_{RRC}(n)^{all} + TBS_{Mac-C}(n)^{all}}{TBS_{total}(n)^{all}}\right),$$

respectively (similar to Equations 1 and 2).

The pre-selected "essential" information of the traffic represented by a sum of 3 terms, TBS$_{SAE\_GBR}$(n)+TBS$_{RRC}$(n)+TBS$_{Mac-C}$(n), used in Equations 1 and 3 (similar 3 terms are used in Equations 2 and 4 as well) represent only one possible scenario and other definitions of the pre-selected "essential" information are possible.

It is further noted that according to an embodiment of the present invention, both "essential" and "non-essential" load measures may be calculated, e.g., in the Node-B at Layer-2 (the network layer).

FIG. 1 is an example among others of a block diagram of a network element 10 (e.g., Node B, a base transceiver station BTS, etc.) in a wireless network 11 for determining (e.g., calculating) a load measure for the network element 10, according to an embodiment of the present invention.

In the example of FIG. 1, the network element 10 comprises transmitters 12, receivers 18, an allocation and scheduling module 14, a load determining module 15 and a load transmitting module 17.

The load determining module 15 is used to determine (calculate) the load measure according to embodiments of the present invention described herein (e.g., see Equations 1-4) using an input signal 20 from the allocation and scheduling module 14 regarding the downlink information traffic (the signal 20 is transmitted as a signal 20a to corresponding UEs). It is noted that the signal 20 may comprise information about uplink traffic as well if the module 14 is used for scheduling the uplink traffic as well. The module 15 may also get input signal 22a from receivers 18 regarding received uplink signals 22 from the UEs, as shown in FIG. 1, for determining the uplink load measure, according to embodiments of the present invention described herein (e.g., see Equations 1-4). After the load measure is determined (calculated) by the module 15, it may be transmitted using, for example, the load transmitting module 17 to neighbouring elements (e.g., to Node Bs and possibly to other network elements, for example, to Gateways, etc.) for optimizing the network performance as described herein.

According to an embodiment of the present invention, the module 15, 17 or 14 may be implemented as a software or a hardware module or a combination thereof. Furthermore, the module 15, 17 or 14 may be implemented as a separate block or may be combined with any other standard block or it may be split into several blocks according to their functionality. The transmitters 12 and receivers 18 may be implemented as transceivers as well known in the art. All or selected modules of the network element 10 may be implemented using an integrated circuit.

Figure 2:
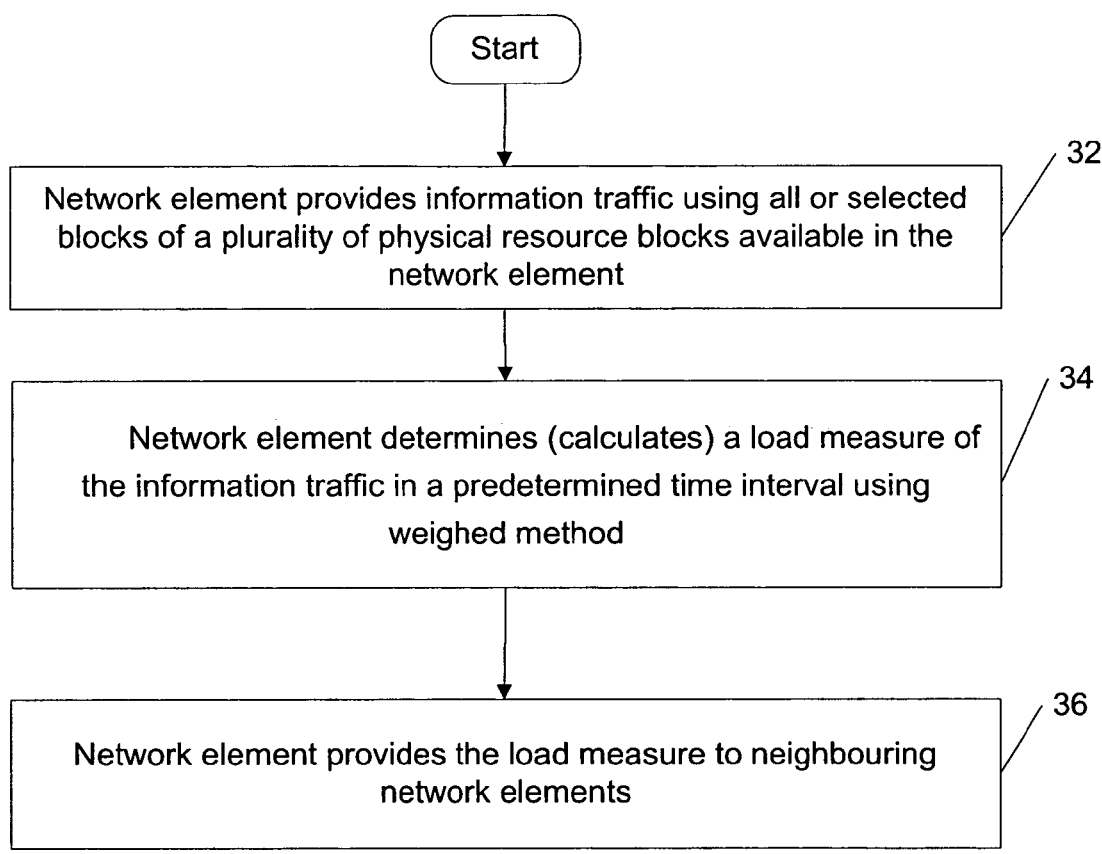
FIG. 2 is a flow chart demonstrating determining a load measure for a network element (e.g., Node B), according to an embodiment of the present invention.

FIG. 2 shows an example of a flow chart demonstrating determining a load measure for a network element (e.g., Node B), according to an embodiment of the present invention.

The flow chart of FIG. 2 only represents one possible scenario among others. It is noted that the order of steps shown in FIG. 2 is not absolutely required, so in principle, the various steps can be performed in different order, in various combinations, or even omitted. In a method according to an embodiment of the present invention, in a first step 32 the network element such as Node B may provide information traffic (downlink or/and uplink) using all or selected blocks of a plurality of physical resource blocks (PSBs) available in the network element (e.g., a PSB may comprise of 12 sub-carriers, or equivalently to a frequency chunk of 180 kHz, and being the same for uplink and downlink). In a next step 34, the network element may determine (calculate) a load measure of the information traffic in a predetermined time interval (e.g., TTI) using the weighted method, according to embodiments of the present invention described herein. In a next step 36, the network element may provide the load measure to the one or more neighbouring network elements for effective control of the information traffic in the network.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention may be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   providing an information traffic by a network element using all or selected blocks of a plurality of physical resource blocks available in said network element; and
   determining in the network element a load measure of said information traffic by a weighted method using pre-selected information of said information traffic provided by said all or selected blocks participating in said information traffic,
   wherein said load measure is related to use of time and frequency resources by said information traffic
   wherein said load measure is determined in a predetermined time interval; and
   wherein said load measure is in a range between zero and said plurality of physical resource blocks available in said network element.

2. A method, comprising:
   providing an information traffic by a network element using all or selected blocks of a plurality of physical resource blocks available in said network element; and
   determining in the network element a load measure of said information traffic by a weighted method using pre-selected information of said information traffic provided by said all or selected blocks participating in said information traffic, wherein said weighted method comprises: weighting a number of said all or selected blocks with corresponding ratio of a number of digital bits used only for pre-selected information of said information traffic and a total number of digital bits both used for all user equipments participating in said information traffic, and
   wherein said load measure is related to use of time and frequency resources by said information traffic
   wherein said load measure is determined in a predetermined time interval.

3. A method, comprising:
   providing an information traffic by a network element using all or selected blocks of a plurality of physical resource blocks available in said network element; and
   determining in the network element a load measure of said information traffic by a weighted method using pre-selected information of said information traffic provided by said all or selected blocks participating in said information traffic, wherein said weighted method comprises: summing a number of one or more blocks of said all or selected blocks used by each user equipment of said all user equipments participating in said information traffic weighed with corresponding ratios of a number of digital bits used only for said pre-selected information and a total user number of digital bits both used for said each user equipment, and
   wherein said load measure is related to use of time and frequency resources by said information traffic
   wherein said load measure is determined in a predetermined time interval.

4. The method of claim 1, wherein said predetermined time interval is one millisecond.

5. The method of claim 1, wherein said network element is a Node B configured for wireless communications.

6. The method of claim 1, wherein said information traffic is in a downlink.

7. The method of claim 1, wherein said information traffic is in an uplink.

8. The method of claim 1, further comprising:
   providing said load measure to one or more neighbouring network elements.

9. The method of claim 1, wherein said pre-selected information is for an essential information traffic and comprises at least one or all of:
   guaranteed bit rate bearers,
   radio resource control messages and
   medium access control MAC-c protocol data units.

10. The method of claim 1, wherein each of said physical resource blocks comprises twelve continuous sub-carriers of orthogonal frequency division multiplexing access.

11. A computer program product comprising: a non-transitory computer readable storage structure embodying computer program code thereon for execution by a computer processor with said computer program code, wherein said computer program code comprises instructions for performing the method of claim 1.

12. A network element, comprising:
    transmitters and receivers, configured to provide an information traffic using all or selected blocks of a plurality of physical resource blocks available in said network element; and
    a load determining module, configured to determine a load measure of said information traffic in a predetermined time interval by a weighted method using pre-selected information of said information traffic provided by said all or selected blocks participating in said information traffic,
    wherein said load measure is determined in a predetermined time interval; and
    wherein said load measure is in a range between zero and said plurality of physical resource blocks available in said network element.

13. A network element, comprising:
    transmitters and receivers, configured to provide an information traffic using all or selected blocks of a plurality of physical resource blocks available in said network element; and
    a load determining module, configured to determine a load measure of said information traffic in a predetermined time interval by a weighted method using pre-selected information of said information traffic provided by said all or selected blocks participating in said information traffic, wherein said weighted method comprises: weighting a number of said all or selected blocks with corresponding ratio of a number of digital bits used only for pre-selected information of said information traffic and a total number of digital bits both used for all user equipments participating in said information traffic; and
    wherein said load measure is determined in a predetermined time interval.

14. A network element, comprising:
    transmitters and receivers, configured to provide an information traffic using all or selected blocks of a plurality of physical resource blocks available in said network element; and
    a load determining module, configured to determine a load measure of said information traffic in a predetermined time interval by a weighted method using pre-selected information of said information traffic provided by said all or selected blocks participating in said information traffic, wherein said weighted method comprises: summing a number of one or more blocks of said all or selected blocks used by each user equipment of said all user equipments participating in said information traffic weighed with corresponding ratios of a number of digital bits used only for said pre-selected information and a total user number of digital bits both used for said each user equipment; and wherein said load measure is determined in a predetermined time interval.

15. The network element of claim 12, wherein said predetermined time interval is one millisecond.

16. The network element of claim 12, wherein said information traffic is in a downlink.

17. The network element of claim 12, wherein said network element is a Node B configured for wireless communications.

18. The network element of claim 12, wherein said information traffic is in an uplink.

19. The network element of claim 12, further comprising: a load transmitting module configured to transmit said load measure to one or more neighbouring network elements.

20. The network element of claim 12, wherein said pre-selected information is for an essential information traffic and comprises at least one or all of:

guaranteed bit rate bearers,
radio resource control messages and
medium access control MAC-c protocol data units.

21. The network element of claim 12, wherein each of said physical resource blocks comprises twelve continuous sub-carriers of orthogonal frequency division multiplexing access.

22. A network element, comprising:

transmitters and receivers, configured to provide an information traffic using all or selected blocks of a plurality of physical resource blocks available in said network element; and a load determining module, configured to determine a load measure of said information traffic in a predetermined time interval by a weighted method using pre-selected information of said information traffic provided by said all or selected blocks participating in said information traffic;

wherein an integrated circuit comprises the load determining module and said transmitter and receivers; and wherein said load measure is determined in a predetermined time interval.

* * * * *

UNITED STATES PATENT AND TRADEMARK OFFICE
CERTIFICATE OF CORRECTION

PATENT NO. : 8,068,513 B2
APPLICATION NO. : 12/151583
DATED : November 29, 2011
INVENTOR(S) : Frank Frederiksen et al.

It is certified that error appears in the above-identified patent and that said Letters Patent is hereby corrected as shown below:

In column 7, line 43, which is claim 2, line 15, "and" should be deleted.

In column 7, line 63, which is claim 3, line 16, "and" should be deleted.

Signed and Sealed this
Twentieth Day of March, 2012

David J. Kappos
*Director of the United States Patent and Trademark Office*